Patented Nov. 11, 1941

2,262,023

UNITED STATES PATENT OFFICE 2,262,023

VOLATILE WELDING FLUX

Arthur R. Lytle, Niagara Falls, N. Y., and Thomas H. Vaughn, Trenton, Mich., assignors to Union Carbide and Carbon Research Laboratories, Inc., a corporation of New York No Drawing. Original application January 10, 1939, Serial No. 250,140. Divided and this application January 17, 1940, Serial No. 314,240

13 Claims. (Cl. 148—23)

This invention relates to fusion welding and brazing operations in which gaseous fuel is used. Among its more important objects are the provision and use of certain novel welding and brazing fluxes adapted, when suitably introduced into a stream of a welding gas flowing to a welding zone, to impart to the welding flame a powerful and readily controlled uniform fluxing action. The novel flux compositions of the invention are relatively volatile compounds or mixtures comprising essentially the alkyl borates, the fluxing action being derived principally from boric oxide formed by the decomposition in the flame of these volatile borates.

We have discovered that certain distilled lower alkyl borates, such as the methyl, ethyl and isopropyl borates, may be used alone with manifest advantage as volatile welding fluxes by passing a welding gas into contact with a body of the liquid flux. The distilled higher alkyl borates also may serve but, because of their low vapor pressures at atmospheric temperature, it usually is necessary to heat them while contacting the welding gas therewith. Alkyl borates purified by distillation to isolate the non-distillable substances, such as boric acid, oxide, etc., may be used effectively in the process. The presence therein of small amounts of volatile combustible impurities does not interfere with the use of these fluxes. Preferably, the welding gas is dried prior to contacting it with the liquid flux, in the interests of flux economy and of fluxing uniformity. In so far as we know, pure alkyl borates never previously have been used as volatile welding fluxes.

It further has been discovered that a strong and uniform fluxing action may be imparted to a welding or brazing flame by passing part or all of the welding gas flowing thereto into contact with an at least approximately azeotropic mixture or solution of a lower alkyl borate, such as trimethyl borate, and an organic solvent for the borate capable of forming therewith such azeotropic compositions of substantially constant composition. Among such solvents may be mentioned methanol and ethanol; certain ketones, such as acetone and methyl isobutyl ketone ("hexone"); certain chlorinated solvents, such as perchlorethylene; and various other solvents, such as acetonitrile. Both the distilled alkyl borates per se and the at least approximately azeotropic mixtures thereof with volatile organic solvents are relatively inexpensive. The undiluted distilled alkyl borates offer advantages in handling and in use; and each of the fluxes may be completely used up without encountering welding difficulties resulting from flux composition changes or the accumulation of solid non-volatile matter, particularly when employing dry or approximately anhydrous welding gas.

We further have found that the lower alkyl borates or mixtures of the invention advantageously may, for some purposes, be mixed with other volatile fluxes,—for example, with volatile organic silicates, such as alkyl silicates—e. g., methyl and ethyl silicate. The silicates decompose in the welding flame, forming $SiO_2$, which enhances the fluxing action of the boric oxide and provides other advantages.

In the preparation of those volatile fluxes of the invention containing organic borates and organic silicates, it is preferred to employ distilled, and substantially dry or anhydrous alkyl borates and alkyl silicates, in view of the tendency of the borates and silicates to hydrolyze in the presence of moisture, and release boric acid and silicic acid.

So far as we are aware, volatile borate fluxes have heretofore been used, only in the welding of nickel and "Monel" metal. We have found that the fluxes of the invention may be used with very beneficial results in the welding or brazing of other metals, such as copper, brass, bronze, low carbon steel, and high chromium ferrous alloys, for example, rustless iron and stainless steel, in the welding of which solid or liquid fluxes are customarily used. Such customary fluxes leave deposits or encrustations on the metal which must be removed before subsequent operations, such as plating or tinning, can be performed; and the encrustations are in many cases exceedingly difficult to remove. In gas-welding or brazing metals of this class, the fluxes of the invention produce exceptionally sound, clean welds which require no preparation whatever prior to plating or tinning.

While the volatile borate fluxes of the invention are satisfactory for a wide variety of purposes, we have found that an admixture of a volatile organic silicate, e. g., methyl silicate, is advantageous in many cases. In the welding of steel, such a mixture increases the fluidity of the weld and facilitates the welding operation, though no material increase in the strength of the weld has been observed. More importantly, the use of a volatile silicate increases the corrosion-resistance of welds made in stainless steel, and inhibits or minimizes zinc fuming in the brazing (by welding) of metals with welding rods containing substantial percentages of zinc.

In a series of tests, stainless steel coupons were welded, using various flux mixtures (see Table 1), through which a part of the welding gas was bubbled; and control welds were made with a standard stainless steel flux (paste). The welded coupons were then submitted to a standard corrosion test in boiling nitric acid. The comparative corrosion-resistance of the welds is set forth in Table 1 in order of decreasing corrosion-resistance:

Table 1

| Flux mixture | Flux composition (by weight) |
|---|---|
| A | 94% of distilled $(CH_3)_3BO_3$ and 6% of $(CH_3)_4SiO_4$. |
| B | 88% of distilled $(CH_3)_3BO_3$ and 12% of $(CH_3)_4SiO_4$. |
| C | 91% of distilled $(CH_3)_3BO_3$ and 9% of $(CH_3)_4SiO_4$. |
| D | 97% of distilled $(CH_3)_3BO_3$ and 3% of $(CH_3)_4SiO_4$. |
| E | 80% of distilled $(CH_3)_3BO_3$ and 20% of $(CH_3)_4SiO_4$. |
| F | Standard paste flux (borosilicate glass). |

All welds made with volatile flux showed marked superiority in corrosion-resistance over those made with flux F. Results of the test indicate that more than 3% of the silicate in the mixture is preferable, and that 20% is undesirably high.

In another series of tests, high strength steel coupons were welded (brazed) with bronze welding rods of two different compositions, a selected portion of the welding gas being bubbled through the indicated mixtures of ethyl borate and methyl silicate, as follows:

Table 2

| Test | Flux | Rod | Tensile strength | Elongation | Remarks |
|---|---|---|---|---|---|
| | | | Pounds per square inch | Percent | |
| 1 | A | 1 | 50,000 | 35 | Dense fumes |
| 2 | A | 2 | 58,000 | 35 | Slight fume |
| 3 | B | 1 | 51,000 | 35 | Less fume |
| 4 | B | 2 | 58,000 | 31 | Very little fume |

The fluxes used were:
A—Distilled ethyl borate.
B—Distilled ethyl borate+20% by weight of methyl silicate.

The welding rods used had the approximate compositions:

No. 1—Copper 59% to 62%, tin 0.5% to 1.0%, remainder zinc.
No. 2—Copper 56% to 59%, tin 0.75% to 1.10%, silicon 0.02% to 0.1%, iron 0.75% to 1.25%, remainder zinc.

Rod No. 2 is of a composition designed to inhibit zinc fuming.

From these and other tests, it is clearly established that the incorporation of up to about 20% of methyl silicate with the volatile borate flux very definitely inhibits zinc fuming, which is such an objectional feature of brazing operations when welding rods containing zinc are used.

The term "distilled" is used in the specification and claims to designate an alkyl borate and/or alkyl silicate, or a mixture or solution thereof, that is substantially free from solid or non-volatilizable materials, such as boric oxide and/or silica, and boric acid and/or silicic acid. Such a borate or silicate generally is prepared by a distillation.

The term "a welding gas" is used in the specification and claims to designate either a fuel gas adapted for use in welding and/or brazing operations—such as acetylene, hydrogen, ethylene, propane and the like, or mixtures thereof—or a combustion-supporting gas such as oxygen; or an appropriate mixture of a fuel gas and a combustion-supporting gas. It is preferred to introduce the flux composition into the fuel gas prior to mixing the latter with the combustion-supporting gas.

This application is a division of our pending application, Serial No. 250,140, for improvement in "Volatile welding fluxes," filed January 10, 1939.

We claim:

1. A volatile flux for use in welding or brazing metals, said flux consisting of an alkyl borate and an alkyl silicate.

2. A volatile flux for use in welding or brazing metals, said flux consisting of a distilled alkyl borate and an alkyl silicate.

3. A volatile flux for use in welding or brazing stainless steel, said volatile flux comprising a distilled substantially dry alkyl silicate effectively increasing the corrosion-resistance of welds made in stainless steel.

4. A volatile flux for use in welding or brazing metals, said flux consisting of a distilled dehydrated alkyl borate and an alkyl silicate, and at least one dehydrated alcohol selected from the group consisting of methyl alcohol, ethyl alcohol and isopropyl alcohol; the alkyl esters constituting at least about 25% of the said mixture.

5. A welding gas for use in welding and brazing metals, said gas containing a mixture of an alkyl borate and an alkyl silicate.

6. Process for welding and brazing metals, which comprises supplying welding gases consisting of a fuel gas and a combustion-supporting gas to a welding zone to produce a welding flame; and introducing into one or both of said welding gases a volatile flux comprising an alkyl silicate.

7. Process for welding and brazing metals, which comprises supplying welding gases consisting of a fuel gas and a combustion-supporting gas to a welding zone to produce a welding flame; and introducing into at least one of said welding gases a volatile flux comprising an alkyl borate and an alkyl silicate.

8. A volatile flux for use in welding or brazing metals, said flux consisting of distilled ethyl borate and methyl silicate.

9. A volatile flux for use in welding or brazing metals, said flux consisting of distilled ethyl borate and methyl silicate, and at least one dehydrated alcohol selected from the group consisting of methyl alcohol and ethyl alcohol; the said esters constituting at least about 25% of the said mixture.

10. Process for welding and brazing metals, which comprises supplying welding gases consisting of a fuel gas and a combustion-supporting gas to a welding zone to produce a welding flame; and introducing into one or both of said welding gases a volatile flux comprising ethyl borate and methyl silicate.

11. In the process of welding or brazing metals containing zinc, the method of minimizing zinc fuming, which comprises subjecting the molten metal to the action of a flux comprising an alkyl silicate.

12. In the process of welding or brazing metals containing zinc, the method of minimizing zinc fuming, which comprises subjecting the molten metal in the welding or brazing zone to the action of a volatile flux comprising an alkyl borate and an alkyl silicate.

13. A welding gas for use in welding and brazing metals, selected from the group consisting of a fuel gas and a combustion-supporting gas, said gas containing an alkyl silicate functioning as a welding and brazing flux.

ARTHUR R. LYTLE.
THOMAS H. VAUGHN.